United States Patent [19]

Blyakhman

[11] Patent Number: 5,503,936
[45] Date of Patent: Apr. 2, 1996

[54] N-ALKYL-N'-ARYL-P-PHENYLENEDIAMINES AS MODIFIERS FOR EPOXY RESINS

[75] Inventor: Yefim Blyakhman, Bronx, N.Y.

[73] Assignee: Ciba-Geigy Corporation, Tarrytown, N.Y.

[21] Appl. No.: 371,645

[22] Filed: Jan. 12, 1995

Related U.S. Application Data

[63] Continuation-in-part of Ser. No. 204,019, Feb. 28, 1994, abandoned.

[51] Int. Cl.⁶ .......................... C08G 59/40; C08G 59/42
[52] U.S. Cl. .......................... 428/413; 528/91; 528/93; 528/94; 528/102; 528/104; 528/109; 528/113; 528/120; 528/124; 528/327; 528/347; 528/361; 528/407; 525/481; 525/484; 525/504
[58] Field of Search .......................... 528/91, 93, 94, 528/102, 104, 109, 113, 120, 124, 327, 347, 361, 407; 525/481, 484, 504; 428/413

[56] References Cited

U.S. PATENT DOCUMENTS

| | | | |
|---|---|---|---|
| 4,366,108 | 12/1982 | Urech et al. | 528/124 |
| 4,480,082 | 10/1984 | McLean et al. | 528/103 |
| 4,739,028 | 4/1988 | McLean et al. | 528/103 |
| 4,767,809 | 8/1988 | Wingrove | 524/255 |
| 4,816,533 | 3/1989 | McLean et al. | 525/526 |
| 4,851,484 | 7/1989 | Garton et al. | 525/504 |

OTHER PUBLICATIONS

Chem. Abst. 82(22):141101P.
Chem. Abst. 113(18):1538905.
Chem. Abst. 75(14):89370q.
Chem. Abst. 105(26):228670r.
Data Printouts for Chem. Abst. Registry No. 3081–14–9, 793–24–8, 93–46–9 and 74–31–7.

*Primary Examiner*—Frederick Krass
*Attorney, Agent, or Firm*—Luther A. R. Hall

[57] ABSTRACT

N-Alkyl-N'-aryl-p-phenylenediamines, when added at 2.5 to 12.5% by weight, based on the total weight of the epoxy resin and hardener, cause the epoxy resin after curing to exhibit substantial increases in physical properties, such as strength, stiffness, toughness and hot/wet properties, compared to the properties of the cured, but unmodified epoxy resin.

12 Claims, No Drawings

N-ALKYL-N'-ARYL-P-PHENYLENEDIAMINES AS MODIFIERS FOR EPOXY RESINS

This is a continuation-in-part of application Ser. No. 08/204,019, filed on Feb. 28, 1994, now abandoned.

This invention pertains to N-alkyl-N'-aryl-p-phenylenediamines as modifiers for epoxy resins causing the cured modified resins to exhibit substantially increased physical properties.

BACKGROUND OF THE INVENTION

It has long been the goal in the epoxy resin field to improve the physical properties, such as strength and modulus, of cured epoxy resins without concomitantly increasing brittleness.

U.S. Pat. No. 4,480,082 teaches the use of the reaction product of an aromatic amide with a mono- or di-epoxide, such as the adduct of 4-hydroxyacetanilide with phenyl glycidyl ether or vinylcyclohexene dioxide, as fortifier in amine cured epoxy resins.

U.S. Pat. No. 4,739,028 discloses the use of the reaction product of an aromatic polyhydroxy compound with a diepoxide where one oxirane group is less reactive than the other, such as resorcinol with vinylcyclohexene dioxide, as fortifier in amine cured epoxy resins.

U.S. Pat. No. 4,816,533 describes the use of the reaction product of an aromatic amine with a non-symmetrical diepoxide, such as aniline and vinylcyclohexene dioxide, as fortifier for amine cured epoxy resins.

U.S. Pat. No. 4,85 1,484 teaches the use of a carboxylic acid, such as maleic acid, plus the reaction product of a carboxylic acid anhydride and substituted aromatic amine, such as nadic methyl anhydride and m-aminoacetanilide, as fortifier for anhydride cured epoxy resins.

U.S. Pat. No. 4,767,809 describes the use of substituted phenylenediamine compounds, such as instant compound N-1,3-dimethylbutyl-N'-phenyl-p-phenylenediamine, in crosslinked robber compositions to provide high resistance to cut growth. There is no disclosure or suggestion that such substituted phenylenediamine compounds would provide enhanced strength and modulus properties for amine cured epoxy resins.

The N-alkyl-N'-aryl-p-phenylenediamines, particularly N-isopropyl-N'-phenyl-p-phenylenediamine, are widely used as antioxidant, antiozonants and stabilizers for elastomers, rubbers and thermoplastic polymers. Them is no known reference to their use as modifiers for increasing the physical properties of cured epoxy resins containing said modifiers.

DETAILED DISCLOSURE

The instant invention pertains to a curable modified epoxy resin composition, having enhanced physical properties after curing, which comprises (a) an epoxy resin;

(b) an effective amount of a hardener or curing agent; and (c) 2.5 to 12.5% by weight, based on the total weight of epoxy resin and component (b), of a compound of formula I

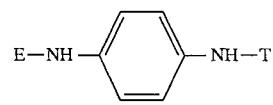

wherein

E and T are independently alkyl of 5 to 12 carbon atoms, cycloalkyl of 5 to 8 carbon atoms, phenylalkyl of 7 to 15 carbon atoms, aryl of 6 to 10 carbon atoms or said aryl substituted by one or two alkyl of 1 to 4 carbon atoms.

Preferably, E is alkyl of 5 to 12 carbon atoms or aryl of 6 to 10 carbon atoms; most preferably aryl of 6 to 10 carbon atoms; especially phenyl.

Preferably, T is alkyl of 6 to 12 carbon atoms; most preferably alkyl of 6 to 8 carbon atoms; especially 1,3-dimethylbutyl or 1,4-dimethylpentyl; most especially 1,3-dimethylbutyl.

Preferably the amount of component (c) is 4 to 11% by weight, based on the total weight of epoxy resin and component (b); most preferably 5 to 10% by weight.

When E and T are alkyl, the alkyl can be straight or branched chain alkyl, for example, n-amyl, sec-amyl, isoamyl, n-hexyl, sec-hexyl, isohexyl, 1,3-dimethylbutyl, 1,4-dimethylpentyl, heptyl, 2-ethylhexyl, isooctyl, tert-octyl, nonyl, n-decyl, isodecyl, lauryl, isododecyl or tert-dodecyl; when cycloalkyl, they are, for example, cyclopentyl, cyclohexyl, cycloheptyl or cyclooctyl; when phenylalkyl, they are, for example, benzyl, α-methylbenzyl, αα-dimethylbenzyl; when aryl or substituted aryl, they are, for example, phenyl, naphthyl, tolyl or xylyl.

The epoxy resins of component (a) useful in the instant invention are conventional epoxy resins having on average more than one epoxy group per molecule, e.g. glycidyl ethers of polyhydric phenols, of aliphatic or cycloaliphatic alcohols, such as bisphenol A, bisphenol F, resorcinol, dihydroxydiphenyl, 4,4'-dihydroxydiphenyl sulfone, dihydroxynaphthalene, and condensation products of phenols or cresols with formaldehyde. Other epoxy resins are glycidyl ethers of halogenated mono-, di- or polynuclear phenols; glycidylated amines, aminophenols and amides; glycidylated polyacids; and cycloaliphatic epoxy resins having epoxy groups attached to cyclohexane or cyclopentane rings. Mixture of polyepoxides as described above and mixtures of polyepoxides with monoepoxides are also contemplated.

Some specific examples of such epoxy resins are those based on the diglycidyl ether of bisphenol A, the diglycidyl ether of hisphenol F; the diglycidyl ether of hydroquinone, of resorcinol, of catechol, of 2,5-dihydroxynaphthalene or of 9,9-bis(4-hydroxyphenyl)fluorene; the tetraglycidyl ether of 3,3,3',3'-tetramethyl-1,1'-spirobisindane-5,5',6,6'-tetraol; the tetraglycidyl derivatives of methylenedianiline, of m-phenylenediamine, of 1,4-di-(α,α-dimethyl-4-aminobenzyl)benzene, of 1,4-di(α,α-dimethyl-3-methyl-4-aminobenzyl)-benzene or of 3,3'-diethyl-4,4'-diaminodiphenylmethane; the triglycidyl derivatives of 4-aminophenol or 3-methyl-4-aminophenol; the diglycidyl derivative of aniline; di(2-glycidyl-oxy-1-naphthyl) methane, di(2,5-diglycidyloxy-1-naphthyl)methane or 2-glycidyloxy- 1-naphthyl-2',5'-diglycidyloxy-1'-naphthyl-methane.

Preferred epoxy resins are liquid polyglycidyl ethers of bisphenol A and of bisphenol F, having epoxy equivalent weight from 160 to 200.

The hardeners or curing agents of component (b) are aliphatic, aromatic or cycloaliphafic di- or polyamines, such as diethylenetriamine, N-aminoethylpiperazine, 4,4'-diaminodicyclohexylmethane, 4,4'-diaminodiphenyl sulfone, diethyldiaminotoluene, dicyandiamide, or guanidine; polycarboxylic acid anhydrides, such as phthalic anhydride or trimellitic anhydride; catalytic curing agents such as tertiary amines, imidazoles or complexes of boron trifluofide; difuncfional and multifunctional phenols, such as bisphenol A, tetrabromobis phenol A, or phenol or cresol novolac resins.

Some preferred embodiments of component (b) are 3,3'-diaminodiphenyl sulfone; 4,4'-diaminodiphenyl sulfone; 4,4'-methylenedianiline; 4,4'-methylenebis(2-chloroaniline); 4,4'-methylenebis(2-methylaniline); m-phenylenediamine; p-phenylenediamine; 1,4-di-(α,α-dimethyl-4-aminobenzyl)benzene, 1,4-di(α,α-dimethyl-3-methyl-4-aminobenzyl)-benzene; 3,3'-diethyl-4,4'-diaminodiphenylmethane; 2,2'-dimethyl-5,5'-diaminodiphenyl sulfone; 1,8-diaminonaphthalene; 4,4'-methylenebis(2,6-diethylaniline); 2,2-dimethyl-2,3-dihydropyrimidine; 1-(4-aminophenyl)-1,3,3-trimethyl-5(6)-aminoindane; trimethylene bis(4aminobenzoate), diethylenetriamine, N-aminoethylpiperazine, 4,4'-diaminodicyclohexylmethane, 2,4-diethyl-3,5-diaminotoluene, phthalic anhydride, trimellitic anhydride; a tertiary amine, an imidazole or a complex of boron trifluoride; bisphenol A, tetrabromobis phenol A, or a phenol or cresol novolac resin; and especially 3,3'-diaminodiphenyl sulfone, 2,4-diethyl-3,5-diaminotoluene, the adduct of 3,3'-diaminodiphenyl sulfone and 3,4-epoxy-cyclohexylmethyl 3,4-epoxycyclohexanecarboxylate, diethylenetriamine, 3,3'-dimethyl-4,4'-diaminodicyclohexane or imidazole catalyst 3-(2-methylimidazol-1-yl)propionic acid; most especially 2,4-diethyl- 3,5-diaminotoluene.

With the exception of the catalytic curing agents, all hardeners of component (b) are used in an amount which is 50–150% of stoichiometric amount which is 1:1 ratio of active hydrogen and epoxy groups. Thus, the effective amount of a hardener of component (b) is from 0.5 to 1.5 equivalents of —NH— for each equivalent of epoxy moiety.

Catalytic curing agents are used in amounts from 0.5 to 15%, based on the weight of component (a).

Epoxy resins modified by the instant compounds of formula I are particularly useful in the production of composites, adhesives, molding compounds, potting compounds, coatings and wide variety of other utilities for which epoxy resins are especially suited. The instant compositions are particularly effective for preparing matrix resins for automated processes in composite manufacture involving filament winding, etc.

The incorporation of the modifier of formula I into said epoxy resin allows the cured epoxy resin to have enhanced physical properties, especially in respect to modulus, strength and elongation. These properties are increased by 10–30% with toughness being increased up to 80%. This is unusual since an increase in modulus is usually accompanied by a decrease in elongation and toughness. The retention of modulus and strength properties under hot/wet conditions is also improved.

Processing characteristics of the instant epoxy resin compositions are improved as well by the modifiers of formula I due to their low viscosity (ca. 50 cps at 60° C.) and reactivity.

The compounds of formula I are known compounds. Some are commercially available such as N-1,3-dimethylbutyl-N'-phenyl-p-phenylenediamine (FLEXZONE® 7L, Uniroyal Chemical). The other compounds of formula I can be made by conventional means from starting materials which are commercially available.

The following examples are presented for the purpose of illustration only and are not to be construed to limit the scope or nature of the instant invention in any manner whatsoever.

The preparation of the instant epoxy resin compositions involves the simple mixing of the three components (a), (b) and (c) at a temperature of 50° to 120° C.

The test methods used in the Examples are as follows:

Mechanical Properties—Flexure and tensile specimens are tested as per ASTM D790 and ASTM D638 respectively. Energy to break $E_b$ is calculated as the area under the load/displacement curve. Toughness is calculated for tensile and flexural tests as $E_b/(L \times b \times a)$ where b x a is the cross-section of the tested bar and L is the gauge length in tensile testing and the span is 3-point bending. Fracture toughness is determined by the 3-point notched bending test with span of 2.54 mm and the notch depth of 1.27 mm according to ASTM STP410.

Dynamic Mechanical Analysis (DMA)—Specimens having a size of 3 mm×12.5 mm×30 mm are tested in a resonating doubly clamped beam mode in the temperature range from 30° to 225° C. at a 10° C./minute heating rate.

Wet Properties—Samples for flexure and DMA tests are measured immediately after 48 hours immersion in boiling water.

EXAMPLE 1

An epoxy resin which is the diglycidyl ether of bisphenol A, with an epoxy equivalent weight of 185, cured with hardener 2,4-diethyl-3,5-diaminotoluene where the ratio of epoxy resin to amine hardener is 1:1 and the cure cycle is one hour at 120° C., then one hour at 150° C. and finally two hours at 180° C. is compared to the same composition except that said composition is modified by 10% by weight of N-1,3-dimethylbutyl-N'-phenyl-p-phenylenediamine, based on the total weight of epoxy resin and hardener.

The physical properties of the two cured resins are seen in the table below.

| Test | Control | Modified | % Improved Properties of Modified Over Control |
|---|---|---|---|
| RT Dry Tensile | | | |
| Modulus (Ksi) | 347 | 404 | 16.5 |
| Modulus (GPa) | 2.39 | 2.78 | |
| Strength (Ksi) | 9.3 | 12.4 | 33 |
| Strength (MPa) | 64 | 85.5 | |
| Elongation % | 4.0 | 6.0 | 50 |
| Toughness* (in-lb/in$^3$) | 223 | 550 | 147 |
| Toughness* (J/m$^3$) | 153 × 10$^5$ | 379 × 10$^5$ | |
| RT Dry Flexural | | | |
| Modulus (Ksi) | 343 | 457 | 33 |
| Modulus (GPa) | 2.36 | 3.15 | |
| Strength (Ksi) | 15.6 | 19.6 | 26 |
| Strength (MPa) | 107 | 135 | |
| Strain % | 7.4 | 9.6 | 30 |
| Toughness* (in-lb/in$^3$) | 81 | 153 | 89 |
| Toughness* (J/m$^3$) | 56 × 10$^5$ | 105 × 10$^5$ | |
| RT Wet** Flexural | | | |
| Modulus (Ksi) | 296 | 453 | 53 |
| Modulus (GPa) | 2.04 | 3.12 | |
| Strength (Ksi) | 14.3 | 18.6 | 30 |
| Strength (MPa) | 98.5 | 128 | |
| Strain % | 6.6 | 7.6 | 15 |

*uniaxial, quasi-static tension, unnotched
**48 hours in boiling water, 1/8" (3.2 mm) thick sample It is clear that the cured modified epoxy resin exhibits far superior physical properties compared to the cured unmodified control epoxy resin.

EXAMPLE 2

An epoxy resin which is the diglycidyl ether of bisphenol F, with an epoxy equivalent weight of 160, cured with hardener 2,4-diethyl-3,5-diaminotoluene where the ratio of epoxy resin to amine hardener is 1:1.2 and the cure cycle is one hour at 120° C., then one hour at 150° C. and finally two hours at 180° C. is compared to the same composition except that said composition is modified by 10% by weight of N-1,3-dimethylbutyl-N'-phenyl-p-phenylenediamine, based on the total weight of epoxy resin and hardener.

The physical properties of the two cured resins are seen in the table below.

| Test Property | Control | Modified | % Improved Properties of Modified Over Control |
|---|---|---|---|
| RT Dry Tensile | | | |
| Modulus (Ksi) | 392 | 462 | 18 |
| Modulus (GPa) | 2.70 | 3.18 | |
| Strength (Ksi) | 9.3 | 13.1 | 41 |
| Strength (MPa) | 64 | 90 | |
| Elongation % | 3.1 | 4.8 | 55 |
| RT Dry Flexural | | | |
| Modulus (Ksi) | 367 | 442 | 20 |
| Modulus (GPa) | 2.53 | 3.05 | |
| Strength (Ksi) | 16.5 | 18.6 | 13 |
| Strength (MPa) | 113 | 128 | |

It is clear that the cured modified epoxy resin exhibits far superior physical properties compared to the cured unmodified control epoxy resin.

EXAMPLE 3

An epoxy resin which is the diglycidyl ether of bisphenol A, with an epoxy equivalent weight of 185, cured with a hardener which is the adduct of 3,3'-diaminodiphenyl sulfone and 3,4-epoxycyclohexylmethyl 3,4-epoxycyclohexanecarboxylate, where the ratio of epoxy resin to amine hardener is 1:0.87 and the cure cycle is four hours at 180° C. is compared to the same composition except where said composition is modified by 10% by weight of N-1,3-dimethyl-butyl-N'-phenyl-p-phenylenediamine, based on the total weight of epoxy resin and hardener. The physical properties of the two cured resins are seen in the table below.

| Test Property | Control | Modified |
|---|---|---|
| RT Dry Tensile | | |
| Modulus Ksi (GPa) | 523 (3.60) | 514 (3.56) |
| Strength Ksi (MPa) | 13.2 (90) | 16.3 (113) |
| Elongation % | 3.3 | 8.0 |
| Toughness in-lb/in$^3$ | 383 | 784 |
| Toughness J/m$^3$ | 264 × 10$^5$ | 540 × 10$^5$ |
| T$_g$ °C., (Dynamic Mechanical Analysis, DMA) | | |
| Dry | 157 | 155 |
| Wet | 131 | 139 |
| Water Absorption* % | 2.3 | 2.0 |

It is clear that the cured modified epoxy resin exhibits far superior physical properties compared to the cured unmodified control epoxy resin.

EXAMPLE 4

When using the epoxy system described in Example 3, the amount of component (c), N-1,3-dimethylbutyl-N'-phenyl-p-phenylenediamine, is varied from 0 to 20% by weight based on the total weight of epoxy resin and hardener, the results of Flexural Modulus, Strength and T$_g$ values Wet and Dry are given in the table below.

| | % by weight of component (c) | | | |
|---|---|---|---|---|
| Test Property | 0 | 10 | 15 | 20 |
| Flexural Modulus (Ksi) | 528 | 545 | 489 | 460 |
| Flexural Modulus (GPa) | 3.64 | 3.75 | 3.37 | 3.17 |
| Flexural Strength (Ksi) | 22.4 | 25.3 | 22.0 | 21.1 |
| Flexural Strength (MPa) | 154 | 174 | 151 | 145 |
| T$_g$(DMA) °C. Dry | 157 | 155 | 142 | 133 |
| T$_g$(DMA) °C. Wet | 131 | 132 | 115 | 104 |

From these data it appears that, for maximum improvement in properties, the optimum amount of component (c) in the instant compositions is about 10% by weight based on the total weight of epoxy resin and hardener.

EXAMPLE 5

An epoxy resin which is the diglycidyl ether of bisphenol A, with an epoxy equivalent weight of 185, cured with hardener diethylenetriamine, where the ratio of epoxy resin to amine hardener is 1:1 and the cure cycle is 24 hours at room temperature, then two hours at 80° C., and finally two hours at 100° C. is compared to the same composition except that said composition is modified by 10% by weight of N-1,3-dimethylbutyl-N'-phenyl-p-phenylenediamine, based on the total weight of epoxy resin and hardener.

The physical properties of the two cured resins are seen in the table below.

| Test Property | Control | Modified |
|---|---|---|
| RT Dry Tensile | | |
| Modulus Ksi (GPa) | 450 (3.10) | 460 (3.17) |
| Strength Ksi (MPa) | 11.2 (77) | 12.5 (86) |
| Elongation % | 5.0 | 5.5 |
| RT Dry Flexural | | |
| Modulus Ksi (GPa) | 390 (2.68) | 423 (2.91) |
| Strength Ksi (MPa) | 16.7 (115) | 18.1 (125) |
| DMA Modulus Ksi (GPa) | | |
| RT Dry | 456 (3.14) | 487 (3.35) |
| RT Wet | 363 (2.43) | 420 (2.81) |
| 180° F. (82° C.) Dry | 412 (2.76) | 439 (2.95) |
| 180° F. (82° C.) Wet | 284 (1.95) | 338 (2.33) |

It is clear that the cured modified epoxy resin exhibits far-superior physical properties compared to the cured unmodified control epoxy resin.

EXAMPLE 6

An epoxy resin which is the diglycidyl ether of bisphenol A, with an epoxy equivalent weight of 185, cured with hardener 3,3'-dimethyl-4,4'diaminodicyclohexane where the ratio of epoxy resin to amine hardener is 1:1 and the cure cycle is one hour at 80° C., then one hour at 100° C. and finally four hours at 150° C. is compared to the same composition except that said composition is modified by 10% by weight of N-1,3-dimethylbutyl-N'-phenyl-p-phenylenediamine, based on the total weight of epoxy resin and hardener.

The physical properties of the two cured resins are seen in the table below.

| Test Property | Control | Modified |
|---|---|---|
| RT Dry Tensile | | |
| Modulus Ksi (GPa) | 364 (2.50) | 392 (2.70) |
| Strength Ksi (MPa) | 9.7 (66) | 10.2 (71) |
| Elongation % | 3.3 | 3.5 |
| RT Dry Flexural | | |
| Modulus Ksi (GPa) | 333 (2.29) | 380 (2.62) |
| Strength Ksi (MPa) | 15.7 (108) | 17.0 (117) |
| DMA Modulus Ksi (GPa) | | |
| RT Dry | 422 (2.90) | 447 (3.08) |
| 200° F. (93° C.) Dry | 345 (2.31) | 384 (2.57) |
| 200° F. (93° C.) Wet | 315 (2.17) | 352 (2.43) |

It is clear that the cured modified epoxy resin exhibits far superior physical properties compared to the cured unmodified control epoxy resin.

EXAMPLE 7

An epoxy resin which is the diglycidyl ether of bisphenol A, with an epoxy equivalent weight of 185, is cured with an imidazole catalyst which is 3-(2-methylimidazol-1-yl)propionic acid. The catalyst is dissolved in triethanolamine at 50% by weight concentration and 5 parts by weight of the solution is used per 100 parts by weight of the epoxy resin. The cure cycle is 30 minutes at 130° C. The properties of the cured resin are compared to the same composition except that said composition is modified by 10% by weight of N-1,3-dimethylbutyl-N'-phenyl-p-phenylenediamine, based on the total weight of epoxy resin and hardener.

The physical properties of the two cured resins are seen in the table below.

| Test Property | Control | Modified | % Improved Properties of Modified Over Control |
|---|---|---|---|
| RT Dry Tensile | | | |
| Modulus (Ksi) | 352 | 414 | 18 |
| Modulus (GPa) | 2.42 | 2.85 | |
| Strength (Ksi) | 6.4 | 7.4 | 16 |
| Strength (MPa) | 44 | 52 | |
| Elongation % | 2.3 | 2.3 | |
| RT Dry Flexural | | | |
| Modulus (Ksi) | 333 | 392 | 18 |
| Modulus (GPa) | 2.29 | 2.70 | |
| Strength (Ksi) | 12.0 | 14.6 | 22 |
| Strength (MPa) | 82 | 100 | |
| DMA Modulus | | | |
| RT Dry Ksi | 385 | 425 | 10 |
| RT Dry GPa | 2.65 | 2.93 | |
| 180° F. (82° C.) Dry Ksi | 339 | 374 | 11 |
| 180° F. (82° C.) Dry GPa | 2.27 | 2.51 | |
| 180° F. (82° C.) Wet Ksi | 281 | 320 | 14 |
| 180° F. (82° C.) Wet GPa | 1.93 | 2.20 | |

It is clear that the cured modified epoxy resin exhibits far superior physical properties compared to the cured unmodified control epoxy resin.

EXAMPLE 8

An epoxy resin which is the diglycidyl ether of bisphenol A, with an epoxy equivalent weight of 185, cured with hardener 2,4-diethyl-3,5-diaminotoluene where the ratio of epoxy resin to amine hardener is 1:1 and the cure cycle is one hour at 120° C., then one hour at 150° C. and finally two hours at 180° C. is compared to the same composition except that said composition is modified by 10% by weight of N,N'-bis(1,4-dimethylpentyl)-p-phenylenediamine, based on the total weight of epoxy resin and hardener.

The physical properties of the two cured resins are seen in the table below.

| Test Property | Control | Modified | % Improved Properties of Modified Over Control |
|---|---|---|---|
| RT Dry Tensile | | | |
| Modulus (Ksi) | 347 | 403 | 16 |
| Modulus (GPa) | 2.39 | 2.70 | |
| Strength (Ksi) | 9.3 | 11.0 | 18 |
| Strength (MPa) | 64 | 74 | |
| Elongation % | 4.0 | 7.0 | 75 |
| Toughness (in-lb/in$^3$) | 223 | 523 | 134 |
| Toughness (J/m$^3$) | $153 \times 10^5$ | $360 \times 10^5$ | |
| RT Dry Flexural | | | |
| Modulus (Ksi) | 343 | 437 | 27 |
| Modulus (GPa) | 2.36 | 2.93 | |
| Strength (Ksi) | 15.6 | 18.5 | 18.6 |
| Strength (MPa) | 107 | 124 | |
| Toughness (in-lb/in$^3$) | 81 | 132 | 63 |
| Toughness (J/m$^3$) | $56 \times 10^5$ | $91 \times 10^5$ | |

It is clear that the cured modified epoxy resin exhibits far superior physical properties compared to the cured unmodified control epoxy resin.

EXAMPLE 9

A mixture of epoxy resins which comprises 25% by weight of N,N,N',N'-tetra-glycidyl-3,3'-diethyl-4,4'-diaminodiphenylmethane with an epoxy equivalent weight of 125, and 75% by weight of the diglycidyl ether of bisphenol F with an epoxy equivalent weight of 160, cured with 3,3'-diaminodiphenyl sulfone, where the ratio of amino groups to epoxy groups is 0.87:1 and the cure cycle is four hours at 180° C. is compared to the same composition except that said composition is modified by 10% by weight of N-1,3-dimethylbutyl-N'-phenyl-p-phenylenediamine, based on the total weight of epoxy resin and hardener.

The physical properties of the two cured resins are seen in the table below.

| Test Property | Control | Modified | % Improved Properties of Modified Over Control |
|---|---|---|---|
| Fracture Toughness, $G_{ic}$ | | | |
| J/m$^2$ | 212 | 324 | 53 |
| lb/in$^2$ | 1.21 | 1.85 | |
| DMA Modulus Ksi (GPa) | | | |
| 180° F. (82° C.) Wet | 412 | 439 | 13 |
| 180° F. (82° C.) Wet | (2.75) | (2.95) | |

It is clear that the cured modified epoxy resin exhibits far superior physical properties compared to the cured unmodified control epoxy resin. This modification gives the unique effect of simultaneous increases in fracture toughness (twice that of the control) and in hot/wet modulus both quite desirable characteristics.

EXAMPLE 10

A mixture of epoxy resins which comprises 25% by weight of N,N,N',N'-tetra-glycidyl-3,3'-diethyl-4,4'-diaminodiphenylmethane with an epoxy equivalent weight of 125, and 75% by weight of the diglycidyl ether of hisphenol F with an epoxy equivalent weight of 160, cured with 3,3'-diaminodiphenyl sulfone, where the ratio of amino groups to epoxy groups is 0.87:1 and the cure cycle is four hours at 180° C. is compared to the same composition except that said composition is modified by 5% by weight of N-1,3-dimethylbutyl-N'-phenyl-p-phenylenediamine, based on the total weight of epoxy resin and hardener.

The physical properties of the two cured resins are seen in the table below.

| Test Property | Control | Modified | % Improved Properties of Modified Over Control |
|---|---|---|---|
| Fracture Toughness, $G_{ic}$ | | | |
| J/m² | 212 | 418 | 97 |
| lb/in² | 1.21 | 2.39 | |
| RT Dry Flexural | | | |
| Modulus (Ksi) | 470 | 555 | 15 |
| Modulus (GPa) | 3.3 | 3.8 | |
| Strength (Ksi) | 22.4 | 24.5 | 9 |
| Strength (MPa) | 154 | 168 | |
| 82° C. Wet Flexural | | | |
| Modulus (Ksi) | 342 | 413 | 21 |
| Modulus (GPa) | 2.4 | 2.9 | |
| Strength (Ksi) | 14.9 | 16.7 | 12 |
| Strength (MPa) | 103 | 116 | |

It is clear that the cured modified epoxy resin exhibits far superior physical properties compared to the cured unmodified control epoxy resin. This modification gives the unique effect of simultaneous increases in fracture toughness (twice that of the control) and in hot/wet modulus both quite desirable characteristics for uses in composites and other applications.

The results given in Examples 1–10 show that epoxy resins which contain 5–10% by weight based on the weight of the epoxy resin of N-1,3-dimethylbutyl-N'-phenyl-p-phenylenediamine or a related modifier give cured products having a combination of high strength, toughness and hot/wet performance properties making said resins suitable for a wide range of applications including tough matrix resins for resin transfer molding where a combination of low resin viscosity with high toughness in the cured resin is needed, for tooling, coatings, adhesives, laminating and electrical applications and electronics packaging, such as encapsulation of semiconductors where the lower yield stress of these compositions will promote stress relief without cracking. In multilayer printed circuit boards, the toughening effect will improve drillability.

What is claimed is:

1. A curable epoxy resin composition, which comprises
   (a) an epoxy resin which is a glycidyl ether or a glycidylated aromatic amine;
   (b) an effective amount of a hardener or curing agent which is different from component (c) and
   (c) 4 to 12.5% by weight, based on the total weight of epoxy resin and component (b), of N-1,3-dimethylbutyl-N'-phenyl-p-phenylenediamine or N,N'-bis(1,4-dimethylpentyl)-p-phenylenediamine.

2. A composition according to claim 1 wherein the epoxy resin of component (a) is selected from the group consisting of the glycidyl ethers of polyhydric phenols, of aliphatic and cycloaliphatic alcohols, of 4,4'-dihydroxydiphenyl sulfone, of dihydroxynaphthalene; of the condensation products of phenols and cresols with formaldehyde; the glycidyl ethers of halogenated mono-, di- and polynuclear phenols; glycidylated amines, aminophenols; and mixtures thereof.

3. A composition according to claim 1 wherein the epoxy resin of component (a) is the diglycidyl ether of bisphenol A, the diglycidyl ether of bisphenol F, the diglycidyl ether of hydroquinone, of resorcinol, of catechol, of 2,5-dihydroxynaphthalene or of 9,9-bis(4-hydroxyphenyl)fluorene; the tetraglycidyl ether of 3,3,3',3'-tetramethyl-1,1'-spirobisindane-5,5',6,6'-tetraol; the tetraglycidyl derivatives of methylenedianiline, of m-phenylenediamine, of 1,4-di-($\alpha\alpha$-dimethyl-4-aminobenzyl)benzene, of 1,4-di($\alpha,\alpha$-dimethyl-3-methyl-4-aminobenzyl)benzene or of 3,3'-diethyl-4,4'-diaminodiphenylmethane; the triglycidyl derivatives of 4-aminophenol or 3-methyl-4-aminophenol; the diglycidyl derivative of aniline; di(2-glycidyl-oxy-1-naphthyl) methane, di(2,5-diglycidyloxy-1-naphthyl)methane or 2-glycidyloxy-1-naphthyl-2',5'-diglycidyloxy-1'-naphthyl-methane.

4. A composition according to claim 3 wherein the epoxy resin of component (a) is the diglycidyl ether of bisphenol A, the diglycidyl ether of bisphenol F, the tetraglycidyl derivative of 3,3'-diethyl-4,4'-diaminodiphenylmethane or mixtures thereof.

5. A composition according to claim 1 wherein component (b) is 3,3'-diaminodiphenyl sulfone; 4,4'-diaminodiphenyl sulfone; 4,4'-methylenedianiline; 4,4'-methylenebis(2-chloroaniline); 4,4'-methylenebis(2-methylaniline); m-phenylenediamine; p-phenylenediamine; 1,4-di($\alpha,\alpha$-dimethyl-4-aminobenzyl)benzene, 1,4-di($\alpha,\alpha$-dimethyl-3-methyl-4-aminobenzyl)-benzene; 3,3'-diethyl-4,4'-diaminodiphenylmethane; 2,2'-dimethyl-5,5'-diaminodiphenyl sulfone; 1,8-diaminonaphthalene; 4,4'-methylenebis(2,6-diethylaniline); 2,2-dimethyl-2,3dihydropyrimidine; 1-(4-aminophenyl)-1,3,3-trimethyl-5(6)-aminoindane; trimethylene bis(4aminobenzoate), diethylenetriamine, N-aminoethylpiperazine, 4,4'-diaminodicyclohexylmethane, 2,4-diethyl-3,5-diaminotoluene,a tertiary amine or an imidazole.

6. A composition according to claim 1 wherein component (b) is 3,3'-diaminodiphenyl sulfone, 2,4-diethyl-3,5-diaminotoluene, an adduct of 3,3'-diaminodiphenyl sulfone and 3,4-epoxy-cyclohexylmethyl 3,4-epoxycyclohexanecarboxylate, diethylenetriamine, 3,3'-dimethyl-4,4'-diaminodicyclohexane or 3-(2-methylimidazol-1-yl)propionic acid.

7. A composition according to claim 6 wherein component (b) is 2,4-diethyl-3,5-diaminotoluene.

8. A composition according to claim 1 wherein component (c) is N-1,3-dimethyl-butyl-N'-phenyl-p-phenylenediamine.

9. A composition according to claim 1 wherein the amount of component (c) is 4 to 11% by weight based on the total weight of epoxy resin and component (b).

10. A composition according to claim 9 wherein the amount of component (c) is 5 to 10% by weight based on the total weight of epoxy resin and component (b).

11. A process for preparing a cured composition from the curable composition according to claim 1 which comprises mixing components (a), (b) and (c) at a temperature of 50° to 120° C. and subsequently subjecting the resulting mixture to conditions sufficient to produce therefrom a cured article comprising a composite, laminate, adhesive encapsulated device, molded product or coating.

12. A composite, laminate, adhesive, encapsulated device, molded product or coating prepared from the composition according to claim 1.

* * * * *